(12) United States Patent
Mathew et al.

(10) Patent No.: US 8,743,936 B2
(45) Date of Patent: Jun. 3, 2014

(54) SYSTEMS AND METHODS FOR DETERMINING NOISE COMPONENTS IN A SIGNAL SET

(75) Inventors: George Mathew, San Jose, CA (US);
Shaohua Yang, Santa Clara, CA (US);
Yuan Xing Lee, San Jose, CA (US);
Hongwei Song, Longmont, CO (US)

(73) Assignee: LSI Corporation, San Jose, CA (US)

( * ) Notice: Subject to any disclaimer, the term of this patent is extended or adjusted under 35 U.S.C. 154(b) by 1066 days.

(21) Appl. No.: 12/652,201

(22) Filed: Jan. 5, 2010

(65) Prior Publication Data

US 2011/0164669 A1    Jul. 7, 2011

(51) Int. Cl.
*H04B 17/00* (2006.01)
*H04Q 1/20* (2006.01)

(52) U.S. Cl.
USPC .......................................... 375/227; 375/341

(58) Field of Classification Search
USPC ................... 375/227, 225, 346, 254
See application file for complete search history.

(56) References Cited

U.S. PATENT DOCUMENTS

| | | | |
|---|---|---|---|
| 5,278,846 A | 1/1994 | Okayama et al. | |
| 5,325,402 A | 6/1994 | Ushirokawa | |
| 5,392,299 A | 2/1995 | Rhines et al. | |
| 5,426,655 A * | 6/1995 | Feig | 714/802 |
| 5,471,500 A | 11/1995 | Blaker et al. | |
| 5,513,192 A | 4/1996 | Janku et al. | |
| 5,550,870 A | 8/1996 | Blaker et al. | |
| 5,612,964 A | 3/1997 | Haraszti | |
| 5,701,314 A | 12/1997 | Armstrong et al. | |
| 5,710,784 A | 1/1998 | Kindred et al. | |
| 5,712,861 A | 1/1998 | Inoue et al. | |
| 5,717,706 A | 2/1998 | Ikeda | |
| 5,802,118 A | 9/1998 | Bliss et al. | |
| 5,844,945 A | 12/1998 | Nam et al. | |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |
| 6,005,897 A | 12/1999 | McCallister et al. | |
| 6,023,783 A | 2/2000 | Divsalar et al. | |

(Continued)

FOREIGN PATENT DOCUMENTS

EP    0522578    1/1993
EP    1814108    8/2007

(Continued)

OTHER PUBLICATIONS

Oenning et al; "Low Density Parity Check Coding for Magnetic Recording Channels with Media Noise", IEEE, Dept. of Electrical Engineering, University of Minnesota, 2001, pp. 2189-2193.*

(Continued)

*Primary Examiner* — Qutbuddin Ghulamali
(74) *Attorney, Agent, or Firm* — Hamilton DeSanctis & Cha

(57) ABSTRACT

Various embodiments of the present invention provide systems and methods for estimating noise components in a received signal set. For example, one embodiment of the present invention provides a noise estimation circuit that includes a data detector circuit and a noise component calculation circuit. The data detector circuit receives a series of data samples and provides a detected output, and the noise component calculation circuit provides an electronics noise power output and a media noise power output each calculated based at least in part on the detected output and the series of data samples.

24 Claims, 7 Drawing Sheets

(56) References Cited

U.S. PATENT DOCUMENTS

| | | | |
|---|---|---|---|
| 6,029,264 A | 2/2000 | Kobayashi et al. |
| 6,041,432 A | 3/2000 | Ikeda |
| 6,065,149 A | 5/2000 | Yamanaka |
| 6,097,764 A | 8/2000 | McCallister et al. |
| 6,145,110 A | 11/2000 | Khayrallah |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,625,775 B1 | 9/2003 | Kim |
| 6,657,803 B1 | 12/2003 | Ling et al. |
| 6,671,404 B1 | 12/2003 | Kawatani et al. |
| 6,748,034 B2 | 6/2004 | Hattori et al. |
| 6,757,862 B1 | 6/2004 | Marianetti, II |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman et al. |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greenberg et al. |
| 7,093,179 B2 | 8/2006 | Shea |
| 7,113,356 B1 | 9/2006 | Wu |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghavan et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghavan et al. |
| 7,424,077 B2* | 9/2008 | Yang et al. ............... 375/360 |
| 7,430,256 B2 | 9/2008 | Zhidkov |
| 7,502,187 B2* | 3/2009 | Annampedu et al. ........... 360/53 |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,590,168 B2 | 9/2009 | Raghavan et al. |
| 7,702,989 B2 | 4/2010 | Graef et al. |
| 7,712,008 B2 | 5/2010 | Song et al. |
| 7,752,523 B1 | 7/2010 | Chaichanavong et al. |
| 7,801,200 B2 | 9/2010 | Tan |
| 7,802,163 B2 | 9/2010 | Tan |
| 2003/0063405 A1 | 4/2003 | Jin et al. |
| 2003/0081693 A1 | 5/2003 | Raghavan et al. |
| 2003/0087634 A1 | 5/2003 | Raghavan et al. |
| 2003/0088834 A1* | 5/2003 | Murakami et al. ............ 716/1 |
| 2003/0112896 A1 | 6/2003 | Raghavan et al. |
| 2003/0134607 A1 | 7/2003 | Raghavan et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0111540 A1 | 5/2005 | Modrie et al. |
| 2005/0157780 A1 | 7/2005 | Werner et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song |
| 2006/0195772 A1 | 8/2006 | Graef et al. |
| 2006/0248435 A1 | 11/2006 | Haratsch |
| 2006/0256670 A1 | 11/2006 | Park et al. |
| 2007/0011569 A1 | 1/2007 | Vila Casado et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0168330 A1 | 7/2008 | Graef et al. |
| 2008/0276156 A1 | 11/2008 | Gunnam et al. |
| 2008/0301521 A1 | 12/2008 | Gunnam et al. |
| 2009/0199071 A1 | 8/2009 | Graef |
| 2009/0235116 A1 | 9/2009 | Tan et al. |
| 2009/0235146 A1 | 9/2009 | Tan et al. |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2009/0299737 A1* | 12/2009 | Ghenania et al. ............. 704/219 |
| 2010/0002795 A1 | 1/2010 | Raghavan et al. |
| 2010/0050043 A1 | 2/2010 | Savin |
| 2010/0061492 A1 | 3/2010 | Noeldner |
| 2010/0070837 A1 | 3/2010 | Xu et al. |
| 2010/0164764 A1 | 7/2010 | Nayak |
| 2010/0185914 A1 | 7/2010 | Tan et al. |
| 2010/0208574 A1* | 8/2010 | Ratnakar Aravind et al. ............ 369/134 |

FOREIGN PATENT DOCUMENTS

| | | |
|---|---|---|
| WO | WO 2006/016751 | 2/2006 |
| WO | WO 2006/134527 | 12/2006 |
| WO | WO 2007/091797 | 8/2007 |

OTHER PUBLICATIONS

K. Gunnam et al., "Value-Reuse Properties of Min-Sum for GF(q)" (dated Oct. 2006) Dept. of ECE, Texas A&M University Technical Note, published about Aug. 2010.

K. Gunnam et al., "Value-Reuse Properties of Min-Sum for GF(q)"(dated Jul. 2008) Dept. of ECE, Texas A&M University Technical Note, published about Aug. 2010.

K. Gunnam "Area and Energy Efficient VLSI Architectures for Low-Density Parity-Check Decoders Using an On-The-Fly Computation" dissertation at Texas A&M University, Dec. 2006.

U.S. Appl. No. 11/461,026, filed Jul. 31, 2006, Tan, Weijun.
U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/763,050, filed Apr. 19, 2010, Ivkovic, et al.
U.S. Appl. No. 12/792,555, filed Jul. 2, 2010, Liu, et al.
U.S. Appl. No. 12/887,330, filed Sep. 21, 2010, Zhang, et al.
U.S. Appl. No. 12/887,369, filed Sep. 21, 2010, Liu et al.
U.S. Appl. No. 12/901,816, filed Oct. 11, 2010, Li et al.
U.S. Appl. No. 12/917,756, filed Nov. 2, 2010, Miladinovic et al.
U.S. Appl. No. 12/947,931, filed Nov. 17, 2010, Yang, Shaohua.
U.S. Appl. No. 12/947,947, filed Nov. 17, 2010, Ivkocic et al.
U.S. Appl. No. 12/972,942, filed Dec. 20, 2010, Liao et al.

Casado et al., Multiple-rate low- denstiy parity-check codes with constant blocklength, IEEE Transations on communications, Jan. 2009, vol. 57, pp. 75-83.

Collins and Hizlan, "Determinate State Convolutional Codes" IEEE Transactions on Communications, Dec. 1993.

Eleftheriou, E. et al., "Low Density Parity-Check Codes for Digital Subscriber Lines", Proc ICC 2002, pp. 1752-1757.

Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.

Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.

(56) References Cited

OTHER PUBLICATIONS

Gunnam, K "Technical Note on Iterative LDPC Solutions for Turbo Equalization", K. Gunnam, G.Choi & M. Yeary, TX A&M Technical Note, Rep. Date:Jul. 2006 http://dropzone.tamu.edu.

K. Gunnam et al., "Next Generation iterative LDPC solutions for magnetic recording storage, "invited paper. The Asilomar Conference on Signals, Systems, and Computers, Nov. 2008.

Han and Ryan, "Pinning Techniques for Low-Floor Detection/Decoding of LDPC-Coded Partial Response Channels", 5th International Symposium on Turbo Codes &Related Topics, 2008.

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Mohsenin et al., "Split Row: A Reduced Complexity, High Throughput LDPC Decoder Architecture", pp. 1-6, printed from www.ece.ucdavis.edu on Jul. 9, 2007.

Sari H et al., "Transmission Techniques for Digital Terrestrial TV Broadcasting" IEEE Communications Magazine, IEEE Service Center Ny, NY vol. 33, No. 2 Feb. 1995.

Unk, "Auto threshold & Auto Local Threshold"[online][retr.May 28, 2010] Retr. from the Internet: http://www.dentristy.bham.ac.uk/landinig/software/autothreshold/autothreshold.html.

Vasic, B., "High-Rate Low-Density Parity-Check Codes Based on Anti-Pasch Affine Geometries," Proc ICC 2002, pp. 1332-1336.

Vasic, B., "High-Rate Girth-Eight Codes on Rectangular Integer Lattices", IEEE Trans. Communications, vol. 52, Aug. 2004, pp. 1248-1252.

Wang Y et al., "A Soft Decision Decoding Scheme for Wireless COFDM With App. to DVB-T" IEEE Transactions on Consumer elect., IEEE Service Center, NY,NY vo. 50, No. 1 Feb. 2004.

Weon-Cheol L.et al., "Vitierbi Decoding Method Using Channel State Information in COFDM System" IEEE Trans. on Consumer Elect, IEEE Service Center, NY,NY vol. 45, No. 3 Aug. 1999.

Yeo et al., "VLSI Architecture for Iterative Decoders in Magnetic Storage Channels", Mar. 2001, pp. 748-755, IEEE trans. Magnetics, vol. 37, No. 2.

Youn, "BER Prfm. Due to Irreg. of Row-Weoght Distr. of the Parity-Check Matirx in Irreg. LDPC Codes for 10-Gb/s Optical Signals" Journal of Lightwave Tech, vol. 23 Sep. 9, 2005.

Zhong et al., "Area-Efficient Min-Sum Decoder VLSI Architecture for High-Rate QC-LDPC Codes in Magnetic Recording", pp. 1-15, Submitted 2006, not yet published.

Zhong, "Block-LDPC: A Practical LDPC Coding System Design Approach", IEEE Trans. on Circuits, Regular Papers, vol. 5, No. 4, pp. 766-775, Apr. 2005.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC Techron, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.

Zhong, "VLSI Architecture of LDPC Based Signal Detection and Coding System for Magnetic Recording Channel", Thesis, RPI, Troy, NY, pp. 1-95, May 2006.

Farhang-Boroujeny, Adaptive Filters: Theory and Applications. John Wiley & Sons Ltd, 1998, Chapter 11. pp. 373-379.

Kavcic and Patapoutian, "A Signal-Dependent Autoregressive Channel Model", IEEE Trans. Magnetics, vol. 35 No. 5, pp. 2316-2318, Sep. 1999.

\* cited by examiner

SYSTEMS AND METHODS FOR DETERMINING NOISE COMPONENTS IN A SIGNAL SET

BACKGROUND OF THE INVENTION

The present inventions are related to systems and methods for determining noise components in a received signal set.

Received information in a data transmission system is effected by various noise factors and is often expressed as a ratio of signal power to noise power. Such transmission systems may include, for example, wireless or wired data transmission systems where data is transferred from a transmission device to a receiving device, and data storage systems where data is transferred to a storage medium in a write operation and retrieved from the same storage medium in a read operation. Knowledge of signal power and noise power may be used in a number of aspects of such systems. Further, the composition of noise in a read back signal may be used to provide information about the health of the recording channel or transmission channel as well as the quality of data-detection we can expect from the read-channel device.

As an example, estimating noise components using conventional methods may include an extensive amount of data-averaging, computations and analysis using an oscilloscope relying on special data patterns. Further, the conventional methods may involve offline operation requiring several data transfers including reads, writes and large amounts of memory. In some cases, such approaches may not be desirable due to resource limitations and/or delays.

Hence, for at least the aforementioned reasons, there exists a need in the art for advanced systems and methods for estimating noise components in a received signal set.

BRIEF SUMMARY OF THE INVENTION

The present inventions are related to systems and methods for determining noise components in a received signal set.

Various embodiments of the present invention provide noise estimation circuits. Such noise estimation circuits include a data detector circuit and a noise component calculation circuit. The data detector circuit receives a series of data samples and provides a detected output, and the noise component calculation circuit provides an electronics noise power output and a media noise power output each calculated based at least in part on the detected output and the series of data samples. In some instances of the aforementioned embodiments, the series of data samples is a first series of data samples, and the noise estimation circuit further includes a noise predictive filter circuit. The noise predictive filter circuit receives a second series of data samples and provides the first series of data samples based at least in part on the second series of data samples and a coefficient set. The noise prediction coefficient set is obtained by running a design algorithm known in the art based at least in part on the first series of data samples and second series of data samples.

In particular instances of the aforementioned embodiments, the noise component calculation circuit includes a partial correlation determination circuit, a prediction error power circuit, a noise power calculation circuit, an electronics noise calculation circuit, and a media noise calculation circuit. The partial correlation determination circuit calculates a partial correlation output based at least in part on the first series of data samples and the coefficient set. The prediction error power circuit calculates a prediction error power output based at least in part on the first series of data samples, and the noise power calculation circuit calculates a noise power output based at least in part on the prediction error power output and the partial correlation output. If prediction error powers are available as part of the noise prediction coefficient set, the prediction error power circuit mentioned above will not be needed. The electronics noise calculation circuit calculates an electronics noise power output based at least in part on the noise power output, and the media noise calculation circuit calculates a media noise power output based at least in part on the electronics noise power output.

Other embodiments of the present invention provide methods for noise component estimation. Such methods include: receiving a data input; applying a data detection algorithm to the data input to yield a detected output; calculating a partial correlation value based at least in part on the noise prediction coefficient set; calculating an error power value based at least in part on the data input and the detected output; calculating a noise power value based on both the error power value and the partial correlation value; and calculating an electronics noise power value based at least in part on the noise power value. In some instances of the aforementioned embodiments, the methods further include calculating a media noise value based at least in part on the electronics noise value. In some cases, the data input is a first data input, and the methods further include performing a noise predictive filtering of a second data input based upon a coefficient set to yield the first series of data samples, and applying a design algorithm to yield the noise prediction coefficient set.

Other embodiments of the present invention provide methods for noise component estimation. Such methods include: receiving a second data input; performing a noise prediction filtering of a second data input based upon a coefficient set to yield a first series of data samples; applying a data detection algorithm to the first series of data samples to yield a detected output; calculating a noise power value based at least in part on the second data input and the detected output; and calculating an electronics noise power value based at least in part on the noise power value. In some instances of the aforementioned embodiments, the methods further include calculating a media noise power value based at least in part on the electronics noise value.

Yet other embodiments of the present invention provide storage devices that include a data processing circuit. The data processing circuit includes a read channel circuit and a noise estimation circuit. The read channel circuit performs a data detection process on a series of digital samples to yield a detected output, and the noise estimation circuit provides an electronics noise power output and a media noise power output each calculated based at least in part on the detected output. In some instances of the aforementioned embodiments, the storage device further includes a storage medium that maintains a data set, and an analog processing circuit that provides an analog signal corresponding to the data set. In such cases, the data processing circuit further includes an analog to digital converter that receives the analog signal and provides a corresponding digital output from which the series of digital samples are derived.

In various instances of the aforementioned embodiments, the read channel circuit includes a noise predictive filter circuit that receives a digital input derived from the corresponding digital output and provides the series of digital samples based upon a coefficient set. In some such cases, the noise estimation circuit includes: a partial correlation determination circuit and a prediction error power circuit. The partial correlation determination circuit calculates a partial correlation output based at least in part on the noise prediction coefficient set. The prediction error power circuit calculates a prediction error power output based at least in part on the series of digital samples—if prediction error powers are not available as part of the noise prediction coefficient set. In various cases, the partial correlation output is calculated using an inverse Levinson-Durbin algorithm, and/or the partial correlation output is calculated based at least in part on the coefficient set. In one or more instances of the aforementioned embodiments, the noise estimation circuit includes a noise power calculation circuit that calculates a noise power output based at least in part on the prediction error power output, the partial correlation output and/or the digital input. In some such cases, the noise estimation circuit further includes an electronics noise calculation circuit that calculates an electronics noise power output based at least in part on the noise power output, and a media noise calculation circuit that calculates a media noise power output based at least in part on the electronics noise power output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for determining noise components in a received signal set.

Figure 1:
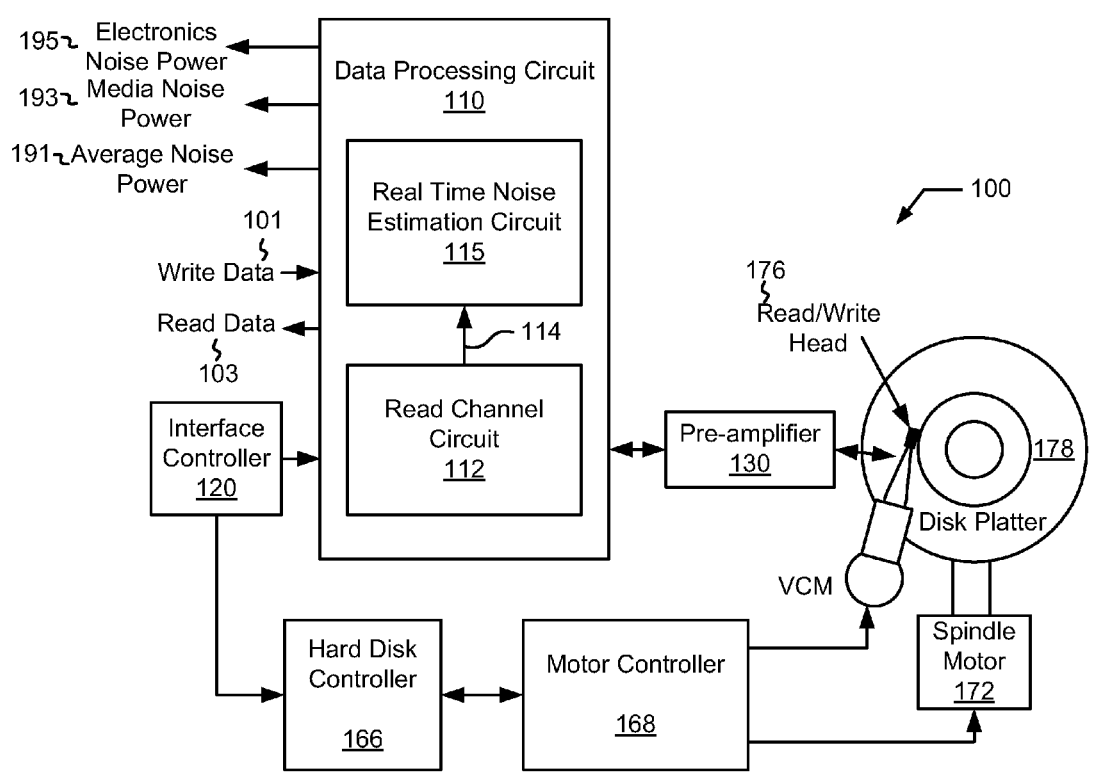
FIG. 1 depicts a storage system with a data processing circuit that includes a read channel circuit and a real time noise estimation circuit in accordance with various embodiments of the present invention.

Turning to FIG. 1, a storage system 100 is depicted including a data processing circuit 110 that includes a read channel circuit 112 and a real time noise estimation circuit 115 in accordance with various embodiments of the present invention. Storage system 100 may be, for example, a hard disk drive. Based upon the disclosure provided herein, one of ordinary skill in the art will recognize other types of devices that may be implemented using the architecture of storage system 100. Read channel circuit 112 may be any circuit known in the art that is capable of receiving encoded data and decoding the received encoded data. In addition, read channel circuit 112 provides one or more interim signals 114 to real time noise estimation circuit 115. Based at least in part on interim signals 114, real time noise estimation circuit 115 calculates average noise power 191, media noise power 193 and electronics noise power 195 associated with the received signal set. As an example, data processing circuit 110 may include circuitry similar to that discussed below in relation to FIG. 2. Read channel circuit 112 may include circuitry similar to that discussed below in relation to FIG. 3, and real time noise estimation circuit 115 may include circuitry similar to that discussed below in relation to FIG. 4. Data processing circuit 110 may provide noise estimation using methods discussed below in relation to FIG. 5.

In addition, storage system 100 includes an interface controller 120, a hard disk controller 166, a motor controller 168, a spindle motor 172, a disk platter 178, and a read/write head assembly 176. Interface controller 120 controls addressing and timing of data transfer to/from disk platter 178. Disk platter 178 may be any magnetic storage medium known in the art including, but not limited to, a longitudinal magnetic storage medium or a perpendicular magnetic storage medium. The data on disk platter 178 consists of groups of magnetic signals that may be detected by read/write head assembly 176 when the assembly is properly positioned over disk platter 178. In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs).

Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is conditioned and amplified using the preamplifier 130 and is transferred to data processing circuit 110. Read channel circuit 112 performs data decoding and data detection processes in an effort to recreate the information originally written to disk platter 178. This data is provided as read data 103 to a receiving circuit. In addition, read channel circuit 112 provides interim signals 114 that are used by real time noise estimation circuit 115 to calculate average noise power 191, media noise power 193 and electronics noise power 195 associated with the received signal set. A write operation is substantially the opposite of the preceding read operation with write data 101 being provided to data processing circuit 110. This data is then encoded and written to disk platter 178. Of note, data processing circuit 110 is capable of writing information to disk platter 178 and subsequently reading the data back. The read back data is used to perform signal and noise estimation. Of further note, noise calculations are not performed on data received as write data 101 and provided to disk platter 178.

Figure 2:
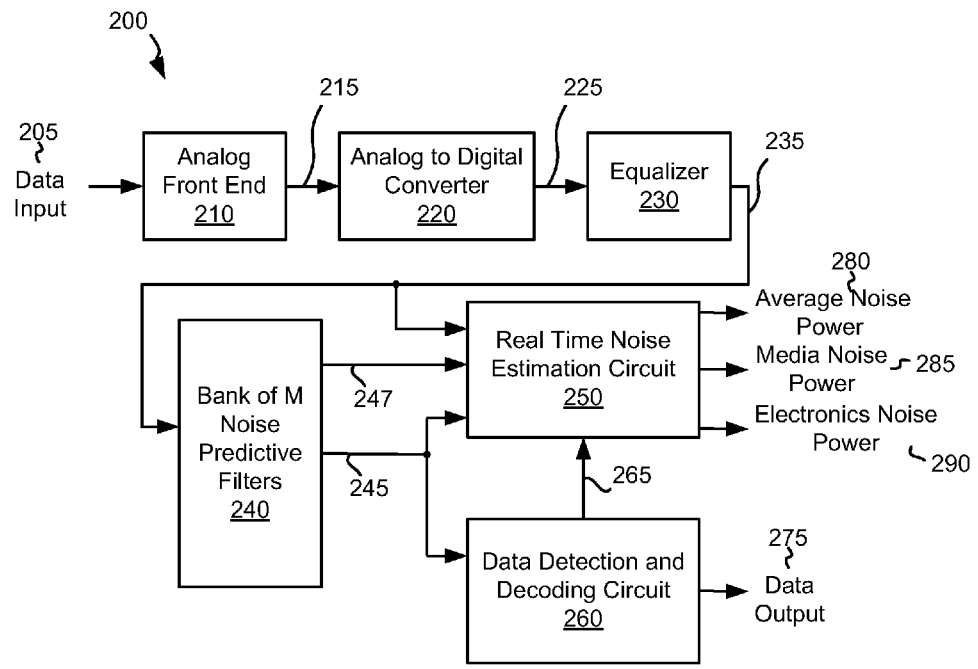
FIG. 2 shows one embodiment of a combination of circuitry from the data processing circuit of FIG. 1 that is operable to provide real time noise estimation in accordance with one or more embodiments of the present invention.

Turning to FIG. 2, a circuit 200 including circuitry that may be used in relation to data processing circuit 110 is shown and is operable to provide real time noise estimation in accordance with one or more embodiments of the present invention. Circuit 200 includes an analog front end circuit 210 that receives an analog data input signal via a data input 205. Analog front end circuit 210 includes various circuits known in the art for massaging an analog signal. For example, analog front end circuit 210 may include an analog filter that is operable to reduce various noise components from the received analog data input signal. Based upon the disclosure provided herein, one of ordinary skill in the art will recognize a variety of analog processing circuitry that may be used in relation to different embodiments of the present invention. The resulting massaged analog signal 215 is provided to an analog to digital converter circuit 220. Analog to digital converter circuit 220 may be any circuit known in the art that is capable of converting an analog signal to a corresponding series of digital samples 225.

Digital samples 225 are provided to an equalizer 230. Equalizer 230 may be any circuit known in the art that is capable of equalizing a digital data input. Equalizer 230 provides a series of equalized digital samples 235 to a bank of M noise predictive filters 240. M filters are included with each of the filters tuned to predict noise corresponding to M data patterns. The coefficients of these M filters are selected based on the correlation properties of the total noise consisting of electronics noise and media noise. One of ordinary skill in the art will recognize a variety of approaches, including adaptive algorithms using equalized digital samples 235 and interim detector output 265, for optimizing the values of the coefficients of the M noise predictive filters 240. In some embodiments of the present invention, the noise predictive filters 240 are finite impulse response filters as are known in the art. In one particular embodiment, the M is sixteen. The M noise prediction filters provide M predictive outputs 245. Predictive outputs 245 are provided to a data detection and decoding circuit 260. Data detection and decoding circuit 260 may be any data detection and decoding circuit known in the art. Data detection and decoding circuit 260 performs one or more data detection and/or decoding processes to predictive outputs 245 to yield a data output 275. Data detection and decoding circuit 260 additionally provides an interim detector output 265 to real time noise estimation circuit 250. A particular implementation of data detection and decoding circuit 260 is depicted in FIG. 3.

In addition, the noise predictive filter coefficients 247 of the M filters and predictive outputs 245 are provided to real time noise estimation circuit 250. Real time noise estimation circuit 250 uses predictive outputs 245, interim detector output 265, noise predictive filter coefficients 247, and/or equalized digital samples 235 to calculate average noise power output 280, media noise power output 285 and electronics noise power output 290 components in the equalized digital samples 235. A particular implementation of real time noise estimation circuit 250 is depicted in FIG. 4.

Figure 3:
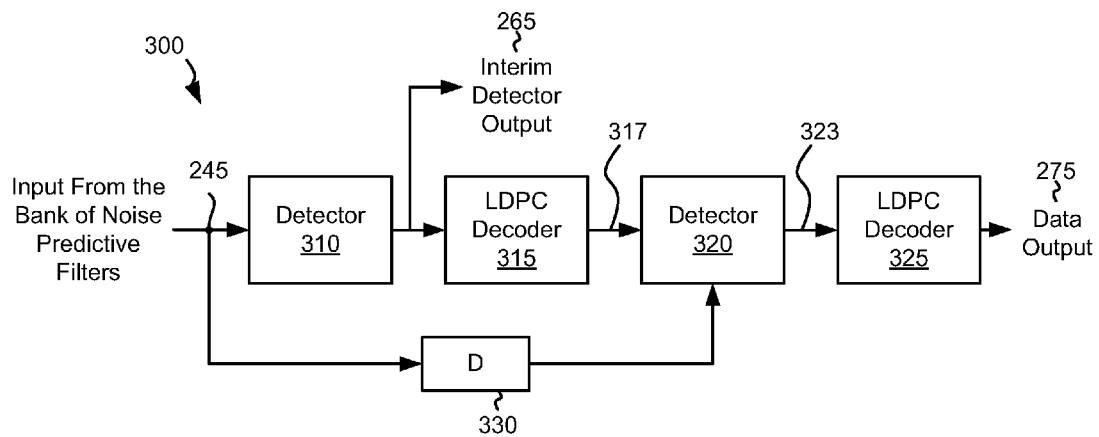
FIG. 3 shows one embodiment of a combination of circuitry from the data processing circuit of FIG. 1 that is operable to provide data detection and decoding in accordance with some embodiments of the present invention.

Turning to FIG. 3, one implementation of a data detection and decoding circuit 300 is shown in accordance with various embodiments of present invention. Data detection and decoding circuit 300 may be used in place of data detection and decoding circuit 260. Data detection and decoding circuit 300 includes a data detector circuit 310 that receives the M predictive outputs 245 from the bank of M noise predictive filters 240. Data detector circuit 310 may be any data detector circuit known in the art including, but not limited to, a maximum a posteriori (MAP) detector circuit or a soft output Viterbi algorithm (SOVA) detector circuit as are known in the art. Based upon the disclosure provided herein, one of ordinary skill in the art will recognize a variety of data detector circuits that may be used in relation to different embodiments of the present invention. Data detector circuit 310 provides interim detector output 265. Interim detector output 265 may represent the most likely signal level for each received bit as determined by data detector circuit 310. As previously mentioned, interim detector output 265 is provided to real time noise estimation circuit 250 to facilitate calculation of the various noise components.

Interim detector output 265 is also provided to a LDPC decoder circuit 315 that applies a decoding algorithm to the received detected data to yield decoded output 317 as is known in the art. The LDPC decoder circuit 315 may be any low density parity check decoder circuit known in the art, or may be replaced by other decoder circuit known in the art including, but not limited to, a Reed Solomon decoder circuit. Based upon the disclosure provided herein, one of ordinary skill in the art will recognize a variety of decoder circuits that may be used in relation to different embodiments of the present invention.

A second data detector circuit 320 receives the M predictive outputs 245 from the bank of M noise predictive filters 240 delayed in time by a delay circuit 330. The delay applied by delay circuit 330 aligns the M predictive outputs 245 from the bank of M noise predictive filters 240 with decoded data output 317. Data detector circuit 320 applies a detection algorithm to the M predictive outputs 245 guided by the soft output data (i.e., likelihood data) available as part of decoded data output 317, and provides a detected data output 323 as is known in the art. Data detector circuit 320 may be any data detector circuit known in the art including, but not limited to, a MAP detector circuit or a SOVA detector circuit as are known in the art. Based upon the disclosure provided herein, one of ordinary skill in the art will recognize a variety of data detector circuits that may be used in relation to different embodiments of the present invention.

Detected data output 323 is provided to a second LDPC decoder circuit 325 that applies a decoding algorithm to the received detected data to yield data output 275 as is known in the art. It should be noted that LDPC decoder circuit 325 may be any low density parity check decoder circuit known in the art, or may be replaced by other decoder circuit known in the art including, but not limited to, a Reed Solomon decoder circuit. Based upon the disclosure provided herein, one of ordinary skill in the art will recognize a variety of decoder circuits that may be used in relation to different embodiments of the present invention.

It should be noted that other data detection and decoding circuits may be used in relation to different embodiments of the present invention. For example, the data detection and decoding circuit depicted in FIG. 3a or FIG. 3b of U.S. patent application Ser. No. 12/114,462 entitled "Systems and Methods for Queue Based Data Detection and Decoding" and filed May 20, 2008 by Yang et al. may be used in place of data detection and decoding circuit 260 where the interim detector output is derived from the output of the channel detectors. The entirety of the aforementioned patent application is incorporated herein by reference for all purposes. As another example, the data detection and decoding circuit depicted in FIG. 3 or FIG. 4 of U.S. patent application Ser. No. 12/430,927 entitled "Systems and Methods for Hard Decision Assisted Decoding" and filed Apr. 28, 2009 by Zhong et al. may be used in place of data detection and decoding circuit 260 where the interim detector output is derived from the output of the channel detectors. The entirety of the aforementioned patent application is incorporated herein by reference for all purposes. As yet another example, the data detection and decoding circuit depicted in FIG. 2a, FIG. 2b, FIG. 4 or FIG. 5a of U.S. patent application Ser. No. 11/461,026 entitled "Systems and Methods for Code Dependency Reduction" and filed Jul. 31, 2006 by Tan may be used in place of data detection and decoding circuit 260 where the interim detector output is derived from the output of the first channel detector or SOVA/MAP detector in the series of processes. The entirety of the aforementioned patent application is incorporated herein by reference for all purposes. Based upon the disclosure provided herein, one of ordinary skill in the art will recognize a variety of other data detection and decoding circuit architectures that may be used in relation to different embodiments of the present invention.

Figure 4A:
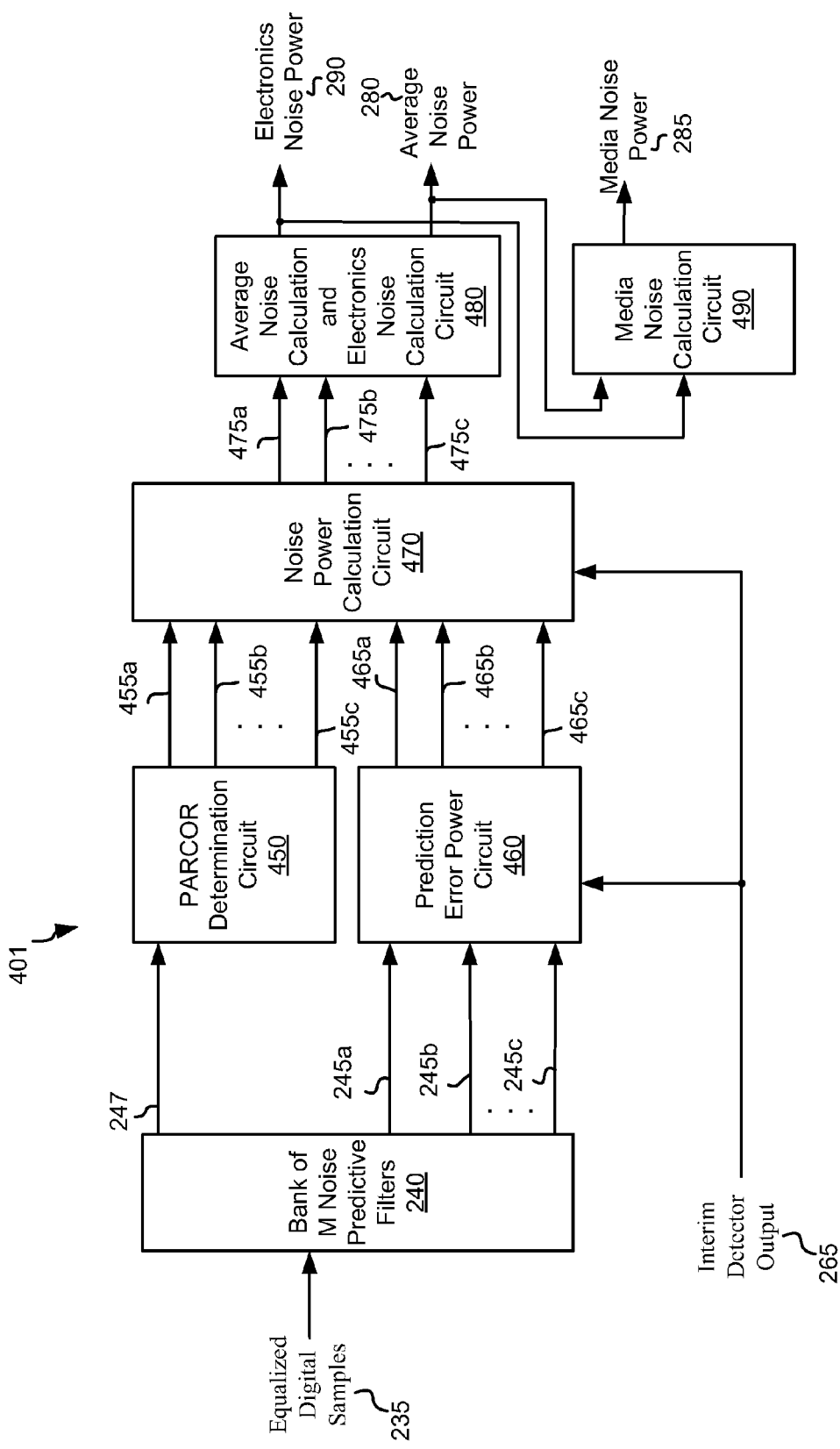
FIG. 4a depicts one embodiment of the real time noise estimation circuit of FIG. 2 in accordance with particular embodiments of the present invention.

Turning to FIG. 4a, an implementation of a real time noise estimation circuit 401 is shown in accordance with particular embodiments of the present invention. Real time noise estimation circuit 401 receives noise predictive filter coefficients 247 and the M predictive outputs 245 from the bank of M noise predictive filters 240. The bank of M noise predictive filters 240 includes M filters that each provides one of the M predictive outputs 245. In one case, $M=2^B$ is the number of prediction filters included in the bank of M noise predictive filters 240, and B is an integer denoting the number of data-bits in the data-pattern associated with each prediction filter. M is more fully defined in the DDAR model of A. Kavcic, "A Signal-Dependent Autoregressive Channel Model", IEEE Transactions on Magnetics, Vol. 35, No. 5, September 1999, pp. 2316-2318. The aforementioned reference is incorporated herein by reference for all purposes. The noise components in each of the M predictive outputs 245 may be characterized by the following equation:

$$y_k[n] = x[n] - \sum_{i=1}^{N} f_{k,i} x[n-i],$$

for $k=, 1, 2, \ldots, M$;
where x[n] denotes the total noise at the output of equalizer 230 (i.e., the noise included in equalized digital samples 235) and is given by the following equation:

$$x[n] = z[n] - \sum_{i=0}^{N_g} g[i] a[n-i],$$

where $[g[0], g[1], \ldots, g[N_g]]$ denote the coefficients of $(N_g+1)$-length partial response (PR) target and a[n] denotes the data bits. Further, $[f_k[1], f_k[2], \ldots, f_k[N]]$ denote the coefficients of the kth predictor where it is assumed that each predictor is of length N coefficients.

Prediction error power circuit 460 utilizes the M predictive outputs 245 and interim detector output 265 to calculate M $y_k[n]$ values and M prediction-error power outputs 465 in accordance with the following equation:

$$y_k[n] = z_k[n] - \sum_{i=0}^{N+N_g} h_k[i] \hat{a}[n-i],$$

for $k=, 1, 2, \ldots, M$;

$$P_{y,k} = \frac{1}{N_k} \sum_{n \in S_k} y_k^2[n]$$

for $k=, 1, 2, \ldots, M$;
where $z_k[n]$ denote the output of k-th predictive output 245, $[h_k[0], h_k[1], \ldots, h_k[N+N_g]]$ denote the convolution of coefficients of k-th predictor and PR target, â[n] denotes the interim detector output 265 which are decisions on the data-bits, $S_k$ denotes the set of bit time instants at which the underlying data pattern in the received equalized digital samples 235 is equal to the particular data pattern length of B bits corresponding to the coefficients of the $k^{th}$ noise prediction filter in the bank of noise predictive filters 240, and $N_k$ is the number of such time instants.

PARCOR determination circuit 450 calculates the underlying partial correlation coefficients using the inverse Levinson-Durbin algorithm. The Levinson-Durbin algorithm is more fully discussed in B. Farhang-Boroujeny, "Adaptive Filters, Theory and Applications", John Wiley & Sons Ltd., Chichester, 1998, pp. 373-79. The aforementioned reference is incorporated herein by reference for all purposes. The PARCOR determination circuit 450 computes N partial correlation outputs 455 for each of the M noise prediction filters according to the following equations for $k=1, 2, \ldots, M$ and for $m=N-1, N-2, \ldots, 1$:

$$K_k[N] = f_k[N],$$

$$f_{k,m}[i] = \frac{f_{k,m+1}[i] + K_k[m+1] \cdot f_{k,m+1}[m+1-i]}{1 - K_k^2[m+1]},$$

for $i=1, 2, \ldots, m$, and $$K_k[m] = f_{k,m}[m],$$

with $[f_{k,N}[1], f_{k,N}[2], \ldots, f_{k,N}[N]] = [f_k[1], f_k[2], \ldots, f_k[N]]$. In such a case, the N*M partial correlation outputs 455 satisfy the property that $|K_k[m]| \leq 1$ for all $k=1, 2, \ldots, M$ and $m=1, 2, \ldots, N$.

The M partial correlation outputs 455 (i.e. $K_k[N]$) and the M prediction-error power outputs 465 (i.e., $P_{y,k}$) are provided to a noise power calculation circuit 470. Noise power calculation circuit 470 calculates the overall noise power evident in equalized digital samples 235, and provides the calculated values as M noise power outputs 475. In particular, $P_{x,k}$ denotes the total noise power at the input of the k-th prediction filter according to the following equation:

$$P_{x,k} = E[x^2[n] | a_k], \text{ for } k=1,2,\ldots,M$$

where $a_k$ denotes the particular data pattern length of B bits corresponding to the coefficient of the $K^{th}$ noise prediction filter in the bank of noise predictive filters 240, and E[.] denotes statistical expectation operator. Based on this, the total noise power, $P_{x,k}$, can be calculated from the corresponding M prediction-error power outputs 465 (i.e., $P_{y,k}$) and the M partial correlation outputs 455 (i.e., $K_k[m]$) using the following equation:

$$P_{x,k} = \frac{P_{y,k}}{\prod_{m=1}^{N}(1 - K_k^2[m])},$$

for $k=1, 2, \ldots, M$ where the symbol Π indicates a multiplication of the successive elements 1 to N.

The M noise power outputs 475 are provided to an average noise calculation and electronics noise calculation circuit 480. The average noise power in equalized digital samples 235 may be expressed as:

$$P_{average} = \sum_{k=1}^{M} P_{x,k} Pr(a_k),$$

where $Pr(a_k)$ is the probability of $a_k$. The probability of the pattern $a_k$ can be calculated using soft data provided as part of interim detector output 265. In particular cases, the likelihood of one of the M patterns (i.e., the same M patterns corresponding to the bank of noise predictive filters 240) is greater than the likelihood of any of the other patterns. The average noise power, $P_{average}$, is provided as an average noise power output 280. The average noise power, $P_{average}$, consists of a combination of the electronics noise power and the media noise power consistent with the following equation:

$$P_{average} = P_{media} + P_{electronics}.$$

Of note, where the noise power outputs 475 correspond to data patterns that do not exhibit any data transitions, the noise power outputs 475 contain only electronics noise. Based upon this understanding, the electronics noise portion of the average noise power may be calculated in accordance with the following equation:

$$P_{electronics} = \frac{P_{x,1} + P_{x,M}}{2}.$$

The electronics noise power, $P_{electronics}$, is provided as an electronics noise power output 290. The aforementioned equations assume that the data patterns that do not exhibit transitions correspond to $a_1$ and $a_M$.

Average noise power output 280 and electronics noise power output 290 are provided to a media noise calculation circuit 490. Media noise calculation circuit 490 provides a media noise power output 285. Media noise power output 285 is calculated in accordance with the following equation:

$$P_{media} = P_{average} - P_{electronics}.$$

It should be noted that the aforementioned average noise power, media noise power, and electronics noise power represent the noise in equalized digital samples 235 (i.e., at the input of the bank of M noise predictive filters 240). Noise composition at earlier junctures in the circuit may be determined using the aforementioned calculations augmented with traditional deconvolution approaches. For example, this may be done by computing the correlations of noise in equalized digital samples 235 as set forth herein, and subsequently using a traditional deconvolution approach (e.g., using z-transform) to compute the noise powers at the input of equalizer 230.

Figure 4B:
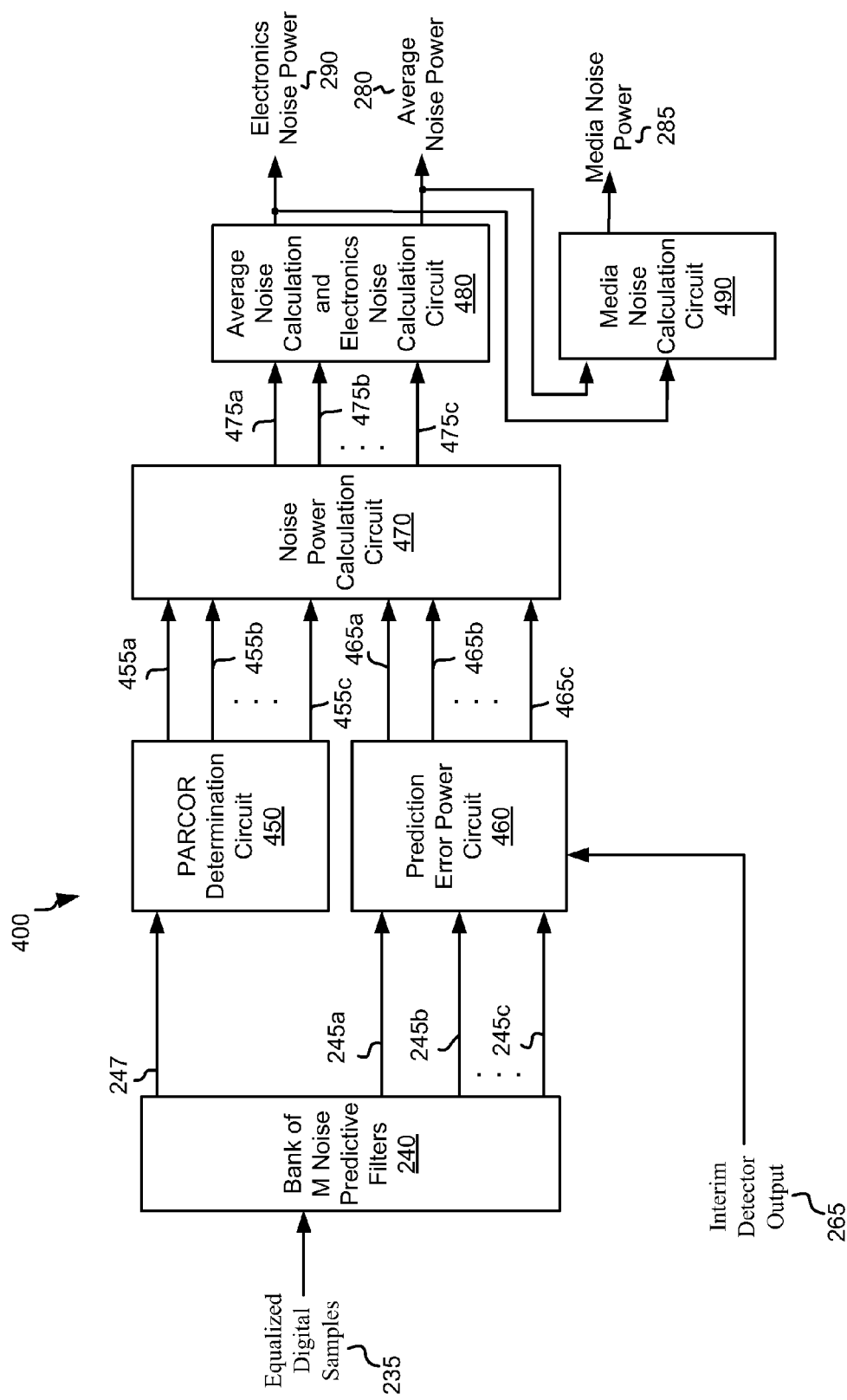
FIG. 4b depicts another embodiment of the real time noise estimation circuit of FIG. 2 in accordance with particular embodiments of the present invention.

Turning to FIG. 4b, another implementation of a real time noise estimation circuit 400 is shown in accordance with other embodiments of the present invention. Real time noise estimation circuit 400 is similar to real time noise estimation circuit 401 except that the calculation of average noise power is simplified by assuming that all patterns, $a_k$, are equally probable. Based upon the simplification, the average noise power included in equalized digital samples 235 may be expressed as:

$$P_{average} = \sum_{k=1}^{M} P_{x,k} Pr(a_k) = \frac{1}{M} \sum_{k=1}^{M} P_{x,k}.$$

The average noise power, $P_{average}$, is provided as an average noise power output 280. The average noise power, $P_{average}$, consists of a combination of the electronics noise power and the media noise power consistent with the following equation:

$$P_{average} = P_{media} + P_{electronics}.$$

Again, where the M noise power outputs 475 correspond to data patterns that do not exhibit any data transitions, the M noise power outputs 475 contain only electronics noise. The electronics noise portion of the average noise power may be obtained in accordance with the following equation:

$$P_{electronics} = \frac{P_{x,1} + P_{x,M}}{2}.$$

The electronics noise power, $P_{electronics}$, is provided as an electronics noise power output 290. The aforementioned equations assume that the data patterns that do not exhibit transitions correspond to $a_1$ and $a_M$.

Average noise power output 280 and electronics noise power output 290 are provided to a media noise calculation circuit 490. Media noise calculation circuit 490 provides a media noise power output 285. Media noise power output 285 is calculated in accordance with the following equation:

$$P_{media} = P_{average} - P_{electronics}.$$

Again, it should be noted that the aforementioned average noise power, media noise power, and electronics noise power represent the noise in equalized digital samples 235 (i.e., at the input of the bank of M noise predictive filters 240). Noise composition at earlier junctures in the circuit may be determined using the aforementioned calculations augmented with traditional deconvolution approaches. For example, this may be done by computing the correlations of noise in equalized digital samples 235 as set forth herein, and subsequently using a traditional deconvolution approach (e.g., using z-transform) to compute the noise powers at the input of equalizer 230.

Figure 4C:
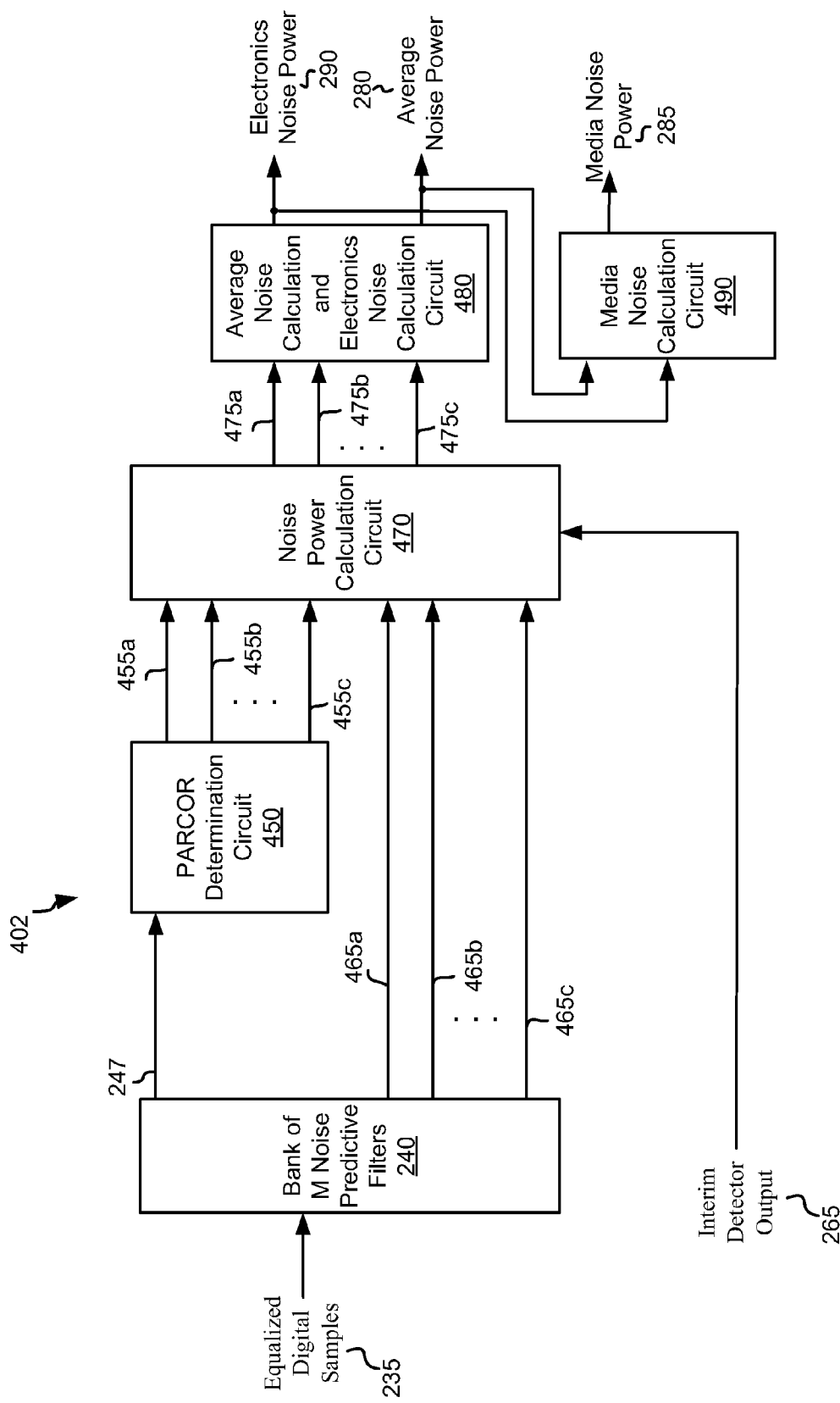
FIG. 4c depicts another embodiment of the real time noise estimation circuit of FIG. 2 in accordance with particular embodiments of the present invention.

Turning to FIG. 4c, another implementation of a real time noise estimation circuit 402 is shown in accordance with other embodiments of the present invention. Real time noise estimation circuit 402 is similar to real time noise estimation circuit 400 except that the prediction error power outputs 465 (i.e. $P_{y,k}$) are assumed to be available as part of the parameters of the noise predictive filters 240. In one such case, the prediction error power outputs 465 are computed during the training mode used for designing the noise predictive filter coefficients 247. The calculation of average noise power can be done by estimating the probabilities of the M patterns as in the case of real time noise estimation circuit 401 or by assuming that all patterns are equally probable as in the case of real time noise estimation circuit 400. The resulting average noise power, $P_{average}$, is provided as an average noise power output 280. The average noise power, $P_{average}$, consists of a combination of the electronics noise power and the media noise power consistent with the following equation:

$$P_{average} = P_{media} + P_{electronics}.$$

Again, assuming that the data patterns $a_1$ and $a_M$ do not exhibit transitions, the electronics noise portion of the average noise power may be obtained in accordance with the following equation:

$$P_{electronics} = \frac{P_{x,1} + P_{x,M}}{2}.$$

The electronics noise power, $P_{electronics}$, is provided as an electronics noise power output 290. Average noise power output 280 and electronics noise power output 290 are provided to a media noise calculation circuit 490. Media noise calculation circuit 490 provides a media noise power output 285. Media noise power output 285 is calculated in accordance with the following equation:

$$P_{media} = P_{average} - P_{electronics}.$$

Again, it should be noted that the aforementioned average noise power, media noise power, and electronics noise power represent the noise in equalized digital samples 235 (i.e., at the input of the bank of M noise predictive filters 240). Noise composition at earlier junctures in the circuit may be determined using the aforementioned calculations augmented with traditional deconvolution approaches. For example, this may be done by computing the correlations of noise in equalized digital samples 235 as set forth herein, and subsequently using a traditional deconvolution approach (e.g., using z-transform) to compute the noise powers at the input of equalizer 230.

Figure 4D:
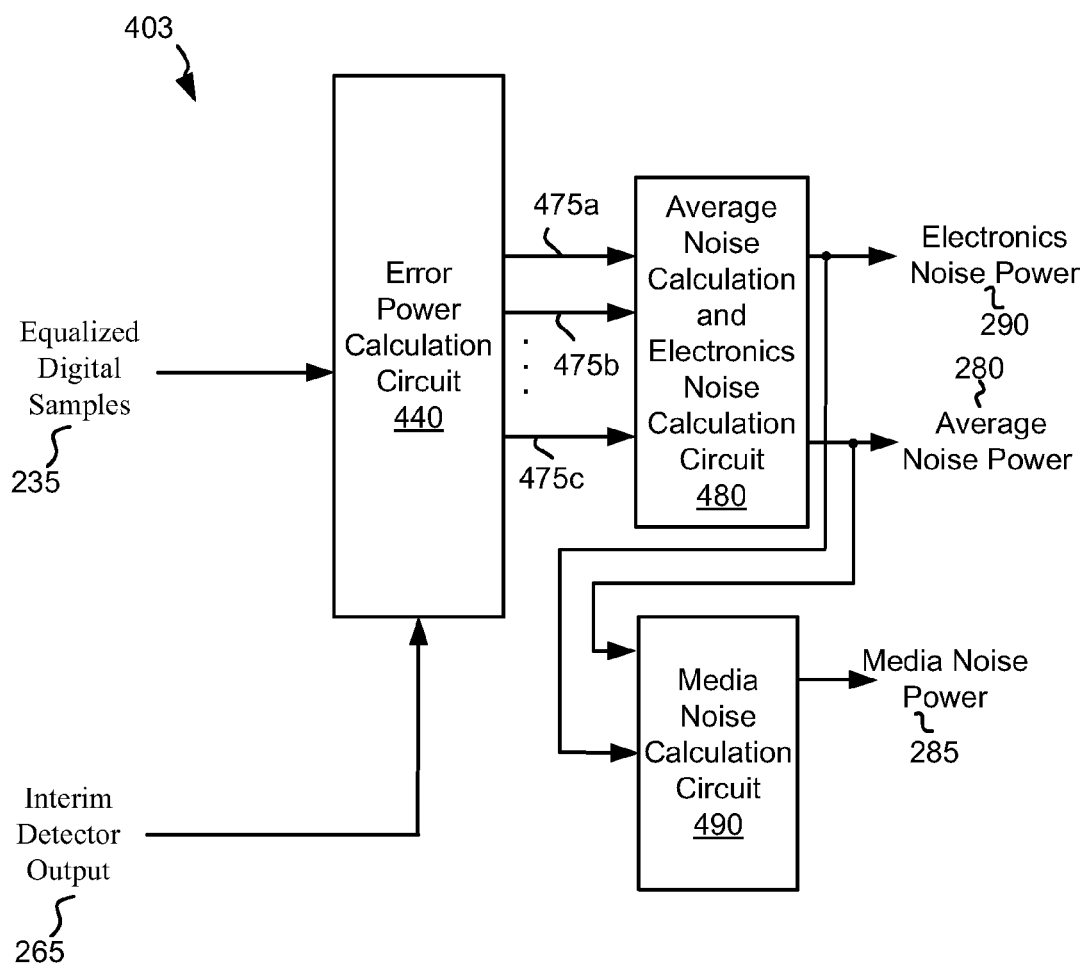
FIG. 4d depicts yet another embodiment of the real time noise estimation circuit of FIG. 2 in accordance with particular embodiments of the present invention.

Turning to FIG. 4d, another implementation of a real time noise estimation circuit 403 is shown in accordance with other embodiments of the present invention. Real time noise estimation circuit 403 does direct computation of the total noise power at the input of each prediction filter (i.e. $P_{x,k}$) according to the following equation:

$$x[n] = z[n] - \sum_{i=0}^{N_g} g[i]\hat{a}[n-i],$$

$$P_{x,k} = \frac{1}{N_k} \sum_{n \in S_k} x^2[n],$$

for $k = 1, 2, \ldots, M$;
where $z[n]$ denotes the equalized digital samples 235, $[g[0], g[1], \ldots, g[N_g]]$ denote the coefficients of $(N_g+1)$-length partial response (PR) target, $x[n]$ denotes the total noise in equalized digital samples 235, $\hat{a}[n]$ denotes the interim detector output 265 which are decisions on the data-bits, $S_k$ denotes the set of bit time instants at which the underlying data pattern in the received equalized digital samples 235 is equal to the particular data pattern length of B bits corresponding to the coefficients of the $k^{th}$ noise prediction filter in the bank of noise predictive filters 240, and $N_k$ is the number of such time instants. The calculation of average noise power can be done by estimating the probabilities of the M patterns as in the case of real time noise estimation circuit 401 or by assuming that all patterns are equally probable as in the case of real time noise estimation circuit 400. The resulting average noise power, $P_{average}$, is provided as an average noise power output 280. The average noise power, $P_{average}$, consists of a combination of the electronics noise power and the media noise power consistent with the following equation:

$$P_{average} = P_{media} + P_{electronics}.$$

Again, assuming that the data patterns $a_1$ and $a_M$ do not exhibit transitions, the electronics noise portion of the average noise power may be obtained in accordance with the following equation:

$$P_{electronics} = \frac{P_{x,1} + P_{x,M}}{2}.$$

The electronics noise power, $P_{electronics}$, is provided as an electronics noise power output 290. Average noise power output 280 and electronics noise power output 290 are provided to a media noise calculation circuit 490. Media noise calculation circuit 490 provides a media noise power output 285. Media noise power output 285 is calculated in accordance with the following equation:

$$P_{media} = P_{average} - P_{electronics}.$$

Again, it should be noted that the aforementioned average noise power, media noise power, and electronics noise power represent the noise in equalized digital samples 235 (i.e., at the input of the bank of M noise predicitve filters 240). Noise composition at earlier junctures in the circuit may be determined using the aforementioned calculations augmented with traditional deconvolution approaches. Based upon the disclosure provided herein, one of ordinary skill in the art will recognize that the noise composition at equalizer input can also be done by replacing the input of error power calculation circuit 440 in FIG. 4d with the digital samples 225 from the output of the analog-to-digital converter 220 in FIG. 2, and replacing the PR target used in error computation with the unequalized channel response.

Figure 5:
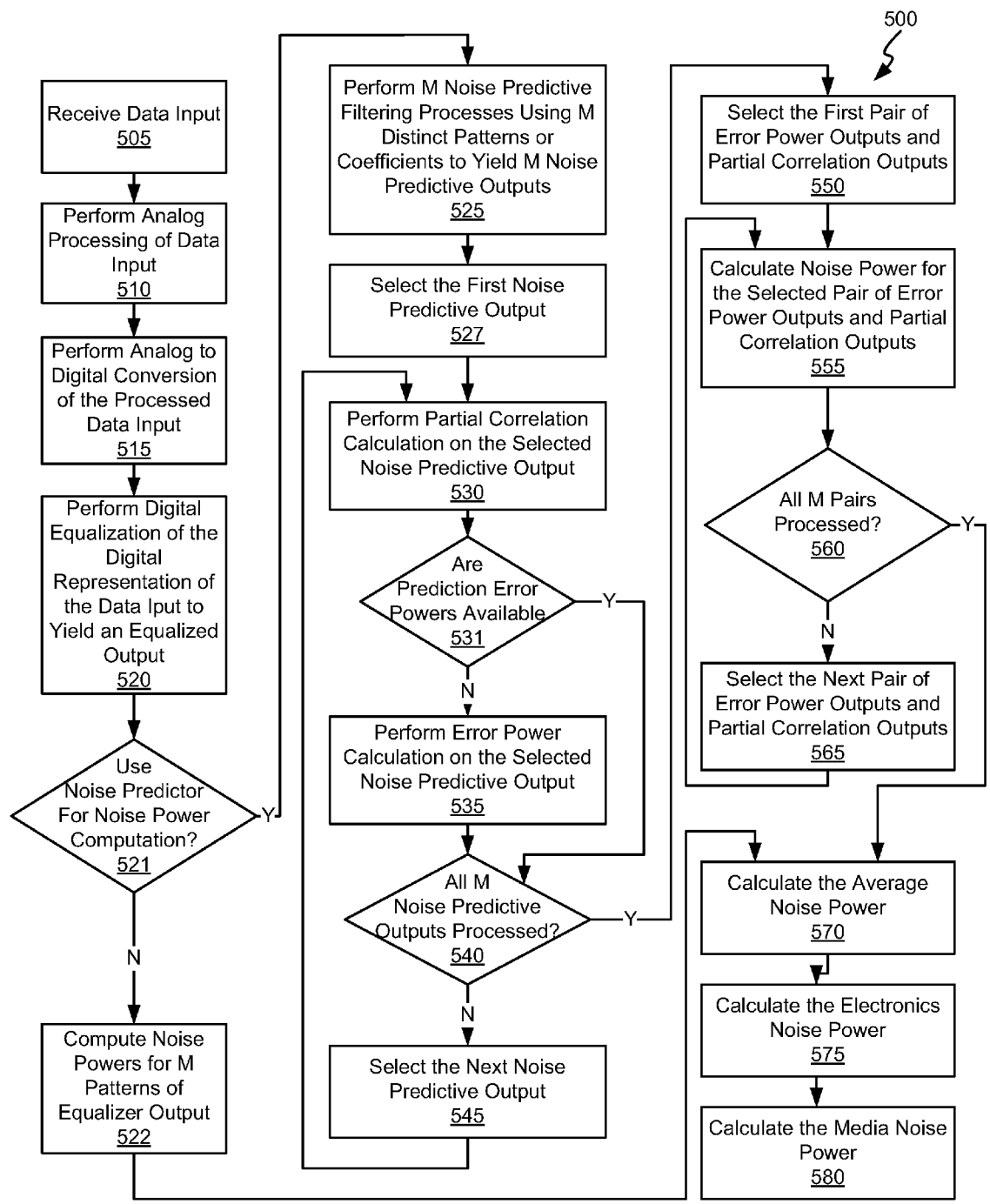
FIG. 5 is a flow diagram showing a method in accordance with one or more embodiments of the present invention for determining noise components in a received signal.

Turning to FIG. 5, a flow diagram 500 shows a method in accordance with one or more embodiments of the present invention for determining noise components in a received signal. Following flow diagram 500, an analog data input is received (block 505). The analog input may be received, for example, from a storage medium or a data transfer channel. Based upon the disclosure provided herein, one of ordinary skill in the art will recognize a variety of sources for the analog data input. Various analog processing is applied to the received analog data input (block 510). Such analog processing may include, but is not limited to, analog filtering and/or amplification as are known in the art.

The processed analog input is converted to a series of digital signals using an analog to digital conversion (block 515). The series of digital samples are equalized to yield an equalized output (block 520). Any equalizer circuit and analog to digital converter circuit known in the art may be used to perform the aforementioned conversion and equalization.

If noise predictors are not to be used for computation of noise powers (block 521), computation of noise powers (i.e. $P_{x,k}$) for each of the M data patterns of length B bits each is done (block 522) in accordance with the following equation:

$$x[n] = z[n] - \sum_{i=0}^{N_g} g[i]\hat{a}[n-i]; \text{ and}$$

$$P_{x,k} = \frac{1}{N_k} \sum_{n \in S_k} x^2[n]$$

for $k = 1, 2, \ldots, M$;
where $z[n]$ denotes the equalized digital samples 235, $\hat{a}[n]$ denotes the interim detector output 265 which are decisions on the data-bits, $S_k$ denotes the set of bit time instants at which the underlying data pattern in the received equalized digital samples 235 is equal to the particular data pattern length of B bits corresponding to the coefficients of the $k^{th}$ noise prediction filter in the bank of noise predictive filters 240, and $N_k$ is the number of such time instants.

Alternatively, if noise predictors are to be used for computation of noise powers (block 521), M noise prediction filters each applying a distinct coefficient set receive the equalized digital samples 235 and perform noise prediction filtering to yield M noise prediction outputs (block 525). The noise prediction filters may be finite impulse response filters that are each tuned using a distinct data pattern to identify a particular noise pattern One of the noise prediction outputs is selected for processing (block 527). A partial correlation calculation is performed on the selected noise prediction output (block 530). Such partial correlation calculation may be done in accordance with the following equations for k=1, 2, . . . , M and for m=N−1, N−2, . . . , 1:

$$K_k[N] = f_k[N],$$

$$f_{k,m}[i] = \frac{f_{k,m+1}[i] + K_k[m+1] \cdot f_{k,m+1}[m+1-i]}{1 - K_k^2[m+1]},$$

for i=1, 2, . . . , m, and $$K_k[m] = f_{k,m}[m],$$

with $[f_{k,N}[1], f_{k,N}[2], \ldots, f_{k,N}[N]] = [f_k[1], f_k[2], \ldots, f_k[N]]$. Of note, calculated partial coefficient outputs satisfy the property that $|K_k[m]| \leq 1$ for all k=1, 2, . . . , M and m=1, 2, . . . , N. In such a case, the value of k corresponds to the selected noise prediction output.

In addition, if prediction error powers are not available as part of the noise prediction filter parameters (block 531), an error power calculation is performed on the selected noise prediction output (block 535). Such error power calculation may be done in accordance with the following equation:

$$y_k[n] = z_k[n] - \sum_{i=0}^{N+N_g} h_k[i]\hat{a}[n-i],$$

for k=, 1, 2, . . . , M;

$$P_{y,k} = \frac{1}{N_k} \sum_{n \in S_k} y_k^2[n]$$

for k=, 1, 2, . . . , M;
Again, k corresponds to the selected noise prediction output, $z_k[n]$ denote the output of k-th predictive output 245 and $[h_k[0], h_k[1], \ldots, h_k[N+N_g]]$ denote the convolution of coefficients of k-th predictor and PR target.

The partial correlation calculation and the error power calculation are repeated for each of the noise prediction outputs. Where it is determined that the calculations have not been performed for all of the noise prediction outputs (block 540), the next noise prediction output is selected (block 545) and the calculations are performed for the next noise prediction output (blocks 530, 535).

Alternatively, where it is determined that the calculations have been performed for all of the noise prediction outputs (block 540), a first pair of error power outputs and partial correlation outputs is selected (block 550). Noise power is calculated for the selected pair of error power output and partial correlation outputs (block 555). Such noise power may be calculated using the following equation:

$$P_{x,k} = \frac{P_{y,k}}{\prod_{m=1}^{N}(1 - K_k^2[m])},$$

where k corresponds to the selected pair of error power outputs and partial correlation outputs. The symbol Π indicates a multiplication of the successive elements 1 to N, $P_{y,k}$ is the $k^{th}$ prediction-error power output, and $K_k[m]$ for m=1, 2, . . . , N are the partial coefficient outputs for the k-th filter. The aforementioned calculation is repeated for each of the pairs of error power outputs and partial correlation outputs. Where it is determined that the calculations have not been performed for all of the pairs (block 560), the next pair is selected (block 565) and the calculations are performed for the next pair (block 555).

Alternatively, where it is determined that the calculations have been performed for all of the pairs (block 560) or if noise powers are computed without using noise predictors (block 522), the average noise power is calculated (block 570) in accordance with the following equation:

$$P_{average} = \sum_{k=1}^{M} P_{x,k} Pr(a_k) = \frac{1}{M} \sum_{k=1}^{M} P_{x,k}.$$

The average noise power, $P_{average}$, consists of a combination of the electronics noise power and the media noise power consistent with the following equation:

$$P_{average} = P_{media} + P_{electronics}.$$

The electronics noise power is calculated (block 575). The electronics noise portion of the average noise power may be expressed in accordance with the following equation:

$$P_{electronics} = \frac{P_{x,1} + P_{x,M}}{2}.$$

The aforementioned equation assumes that the data patterns that do not exhibit transitions correspond to $a_1$ and $a_M$. Next, media noise power is calculated (block 580). Media noise power may be calculated in accordance with the following equation:

$$P_{media} = P_{average} - P_{electronics}.$$

In conclusion, the invention provides novel systems, devices, methods and arrangements for estimating noise components in a received signal set. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data transfer system, the data transfer system comprising:
 a data processing circuit, wherein the data processing circuit includes:

a read channel circuit operable to apply a data detection algorithm to a series of digital samples to yield a detected output; and a noise estimation circuit operable to provide an electronics noise power output and a media noise power output each calculated based at least in part on the detected output, wherein the noise estimation circuit includes a noise power calculation circuit operable to calculate an overall noise power output based at least in part on a partial correlation output.

2. The data transfer system of claim 1, wherein the data transfer system is implemented as part of a storage device operable to transfer information from a storage medium.

3. The data transfer system of claim 1, the data transfer system further comprising:

a storage medium operable to maintain a data set;

an analog processing circuit operable to provide an analog signal corresponding to the data set; and wherein the data processing circuit further includes an analog to digital converter operable to receive the analog signal and to provide a corresponding digital output from which the series of digital samples are derived.

4. Data transfer system of claim 1, wherein the read channel circuit comprises:

a noise predictive filter circuit operable to receive a digital input and to provide the series of digital samples based upon a coefficient set.

5. The data transfer system of claim 4, wherein the noise estimation circuit comprises:

a partial correlation determination circuit operable to calculate the partial correlation output based at least in part on a prediction coefficient set; and a prediction error power circuit operable to calculate a prediction error power output based at least in part on the series of digital samples, wherein the noise power calculation circuit operable to calculate the overall noise power output based at least in part on the prediction error power output.

6. The data transfer system of claim 4, wherein the partial correlation output is calculated using an inverse Levinson-Durbin algorithm.

7. The data transfer system of claim 4, wherein the partial correlation output is calculated based at least in part on the coefficient set.

8. The data transfer system of claim 1, wherein the data transfer system is implemented as part of an integrated circuit.

9. The data transfer system of claim 1, wherein the noise estimation circuit further comprises:

an electronics noise calculation circuit operable to calculate an electronics noise power output based at least in part on the noise power output; and a media noise calculation circuit operable to calculate a media noise power output based at least in part on the electronics noise power output.

10. The data transfer system of claim 1, wherein the data detection algorithm is selected from a group consisting of: a maximum a posteriori data detection algorithm and a Viterbi algorithm data detection algorithm.

11. The data transfer system of claim 1, wherein the read channel circuit includes a data detector circuit operable to provide the detected output and a decoder circuit that receives the detected output and provides a corresponding decoded output.

12. The data transfer system of claim 11, wherein the decoder circuit is selected from a group consisting of: a low density parity check decoder circuit and a Reed Solomon decoder circuit.

13. A data transfer system, the data transfer system comprising:

a data detector circuit operable to receive a series of data samples and to provide a corresponding detected output; and a noise component calculation circuit operable to provide an electronics noise power output and a media noise power output each calculated based at least in part on the detected output and the series of data samples, and wherein the noise component calculation circuit includes:

a media noise calculation circuit operable to calculate the media noise power output; and an electronics noise calculation circuit operable to calculate the electronics noise power output based at least in part on an overall noise power output.

14. The data transfer system of claim 13, wherein the noise component calculation circuit comprises:

a partial correlation determination circuit operable to calculate a partial correlation output based at least in part on a coefficient set;

a prediction error power circuit operable to calculate a prediction error power output based at least in part on the series of data samples;

a noise power calculation circuit operable to calculate a noise power output based at least in part on the prediction error power output and the partial correlation output;

an electronics noise calculation circuit operable to calculate an electronics noise power output based at least in part on the noise power output; and a media noise calculation circuit operable to a media noise power output based at least in part on the electronics noise power output.

15. The data transfer system of claim 13, wherein the data transfer system is implemented as part of a storage device operable to transfer information from a data storage device.

16. The data transfer system of claim 13, wherein the data transfer system is implemented as part of an integrated circuit.

17. The data transfer system of claim 13, wherein the data detector circuit is included in a data processing circuit, wherein the data processing circuit further comprises:

a decoder circuit that receives the detected output and provides a corresponding decoded output.

18. The data transfer system of claim 17, wherein the decoder circuit is selected from a group consisting of: a low density parity check decoder circuit and a Reed Solomon decoder circuit.

19. The data transfer system of claim 13, wherein the noise component calculation circuit comprises:

a partial correlation determination circuit operable to calculate a partial correlation output based at least in part on the prediction coefficient set; and a prediction error power circuit operable to calculate a prediction error power output based at least in part on the series of digital samples.

20. The data transfer system of claim 19, wherein the partial correlation output is calculated using an inverse Levinson-Durbin algorithm.

21. The data transfer system of claim 19, wherein the partial correlation output is calculated based at least in part on the coefficient set.

22. The data transfer system of claim 13, wherein the noise component calculation circuit comprises:
- a noise power calculation circuit operable to calculate a noise power output based at least in part on the prediction error power output and the partial correlation output.

23. A data transfer system, the data transfer system comprising:
- a storage medium operable to maintain a data set;
- an analog processing circuit operable to provide an analog signal corresponding to the data set; and
- a data processing circuit, wherein the data processing circuit includes:
    - an analog to digital converter operable to receive the analog signal and to provide a series of digital samples corresponding to the analog signal;
    - a read channel circuit operable to apply a data detection algorithm to the series of digital samples to yield a detected output; and
    - a noise estimation circuit operable to provide an electronics noise power output and a media noise power output each calculated based at least in part on a prediction error power output, wherein the prediction power output is calculated based at least in part on the detected output.

24. The data transfer system of claim 23, wherein the noise estimation circuit comprises:
- a noise power calculation circuit operable to calculate a noise power output based at least in part on a prediction error power output and a partial correlation output.

* * * * *